United States Patent
Surnilla et al.

(10) Patent No.: US 8,020,538 B2
(45) Date of Patent: Sep. 20, 2011

(54) COOLED EGR SYSTEM FOR COOLANT HEATING DURING COLD ENGINE START

(75) Inventors: Gopichandra Surnilla, West Bloomfield, MI (US); David Karl Bidner, Livonia, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/790,569

(22) Filed: May 28, 2010

(65) Prior Publication Data

US 2011/0139133 A1 Jun. 16, 2011

(51) Int. Cl.
*F02B 47/08* (2006.01)
*F02M 25/07* (2006.01)

(52) U.S. Cl. ............ 123/568.12; 123/568.21; 701/108; 60/605.2; 60/274

(58) Field of Classification Search ............. 123/568.12, 123/568.21; 701/108; 60/274, 278, 320, 60/602, 605.2, 615
See application file for complete search history.

(56) References Cited

U.S. PATENT DOCUMENTS

| | | | |
|---|---|---|---|
| 6,253,545 B1 * | 7/2001 | Suzuki | 60/278 |
| 6,789,512 B2 | 9/2004 | Duvinage et al. | |
| 7,254,947 B2 | 8/2007 | Burk et al. | |
| 7,287,521 B2 | 10/2007 | Yang | |
| RE39,937 E | 12/2007 | Coleman | |
| 7,305,976 B1 * | 12/2007 | Clarke | 123/568.12 |
| 7,717,099 B2 * | 5/2010 | Nagae et al. | 123/568.21 |
| 2007/0089400 A1 | 4/2007 | Huang | |
| 2008/0271721 A1 | 11/2008 | Wikstrom | |
| 2009/0114171 A1 | 5/2009 | Hayashi | |

* cited by examiner

*Primary Examiner* — Willis Wolfe, Jr.
*Assistant Examiner* — Anthony L Bacon
(74) *Attorney, Agent, or Firm* — Julia Voutyras; Alleman Hall McCoy Russell & Tuttle LLP

(57) ABSTRACT

Various systems and method for heating an engine in a vehicle during a cold start are described. In one example, thermal efficiency of the engine is improved by heating engine coolant via a high-pressure exhaust gas recirculation (HP-EGR) system. For example, after light-off of an exhaust catalyst, exhaust gas is routed through the HP-EGR system which includes a HP-EGR cooler. Heat from the exhaust gas is then used to warm the engine coolant via the HP-EGR cooler. One or more engine operating parameters are adjusted in response to the HP-EGR entering the engine during the cold start in order to maintain combustion stability.

20 Claims, 6 Drawing Sheets

COOLED EGR SYSTEM FOR COOLANT HEATING DURING COLD ENGINE START

TECHNICAL FIELD

The present application relates to heating an engine during a cold start and, more specifically, to using an exhaust gas recirculation cooler to heat engine coolant.

BACKGROUND AND SUMMARY

Under cold start conditions, an engine has cooled to ambient conditions, which may be relatively hot or cold, and each component of the engine warms-up to a desired operating temperature. During this time, there may be high friction within the engine due to a higher viscosity of engine fluids such as engine oil when they are relatively cold, and further, heat may be lost to engine coolant thereby reducing a thermal efficiency of the engine. Overall, these effects may lead to a lower fuel economy, for example.

The inventors herein have recognized the above problems and have devised an approach to at least partially address them. Thus, a method for heating a turbocharged engine in a vehicle is disclosed. The method comprises, during a cold engine start and after light-off of an exhaust catalyst, initiating operation of a high-pressure exhaust gas recirculation system (HP-EGR) by opening a HP-EGR valve, the HP-EGR system having a cooler which is part of an engine coolant circuit, and adjusting an engine operating parameter based on combustion stability in order to increase an amount of HP-EGR.

By using HP-EGR to heat the coolant, fuel economy may be improved without adding additional components to the engine system for coolant heating. Further, engine coolant temperature may be increased at a high rate due to the relatively low temperature of the engine coolant compared to the exhaust gas temperature leading to improved fuel economy during the cold start. Moreover, increasing an amount of HP-EGR before the engine is warmed-up may reduce combustion stability; therefore, by adjusting one or more engine operating parameters such as cam timing and fuel injection, combustion stability may be maintained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for using exhaust gas recirculation (EGR) to heat an engine in a vehicle during a cold start. In one example, after light-off of an exhaust catalyst when all of the exhaust gas is no longer needed to heat the exhaust catalyst, a high-pressure exhaust gas recirculation (HP-EGR) system is operated in order to transfer heat to engine coolant via an HP-EGR cooler. By routing some of the exhaust gas through the HP-EGR system, heat exchange can occur between the high temperature exhaust gas and the relatively low temperature engine coolant. Further, one or more engine operating parameters (e.g., cam timing, fuel injection, etc.) may be adjusted in order to maintain combustion stability while a high amount of EGR enters the combustion chamber during the cold start. As such, engine heating may be expedited while thermal efficiency of the engine may be improved without reducing combustion stability.

Figure 1:
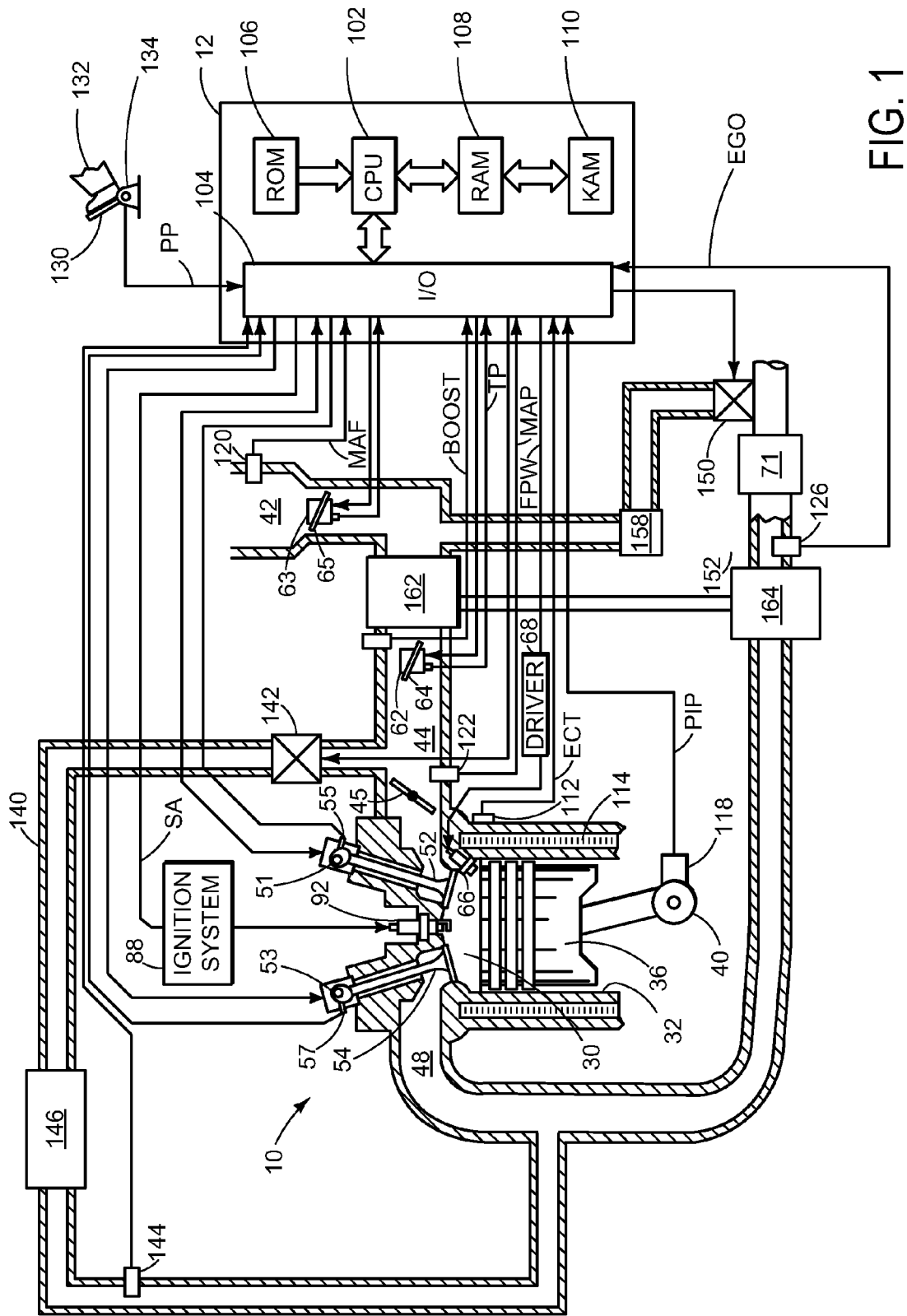
FIG. 1 shows a schematic diagram of an engine including high-pressure and low-pressure exhaust gas recirculation systems.

Referring now to FIG. 1, is a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark. In some embodiments, the ignition system may include a dual spark system which includes two spark plugs per cylinder (not shown).

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12. Further, intake manifold 44 may include charge motion control valve 45 for controlling the intensity of charge motion occurring in combustion chamber 30.

Further, in the disclosed embodiments, an exhaust gas recirculation (EGR) system may route a desired portion of exhaust gas from exhaust passage 48 to intake passage 44 via high-pressure EGR (HP-EGR) passage 140 and/or low-pressure EGR (LP-EGR) passage 150. The amount of EGR provided to intake passage 44 may be varied by controller 12 via HP-EGR valve 142 or LP-EGR valve 152. In some embodiments, a throttle may be included in the exhaust to assist in driving the EGR. Further, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high-pressure EGR system where EGR is routed from upstream of a turbine of a turbocharger to downstream of a compressor of a turbocharger and a low-pressure EGR system where EGR is routed from downstream of a turbine of a turbocharger to upstream of a compressor of the turbocharger. Further, as shown in FIG. 1, the HP-EGR system may include HP-EGR cooler 146 and the LP-EGR system may include LP-EGR cooler 158 to reject heat from the EGR gasses to engine coolant, for example. In alternative embodiments, engine 10 may include only an HP-EGR system or only an LP-EGR system.

As such, Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control system 70 and downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_X$, HC, or CO sensor.

Emission control device 71 is shown arranged along exhaust passage 48 downstream of exhaust gas sensor 126. Emission control devices 71 may be a selective catalytic reduction (SCR) system, three way catalyst (TWC), $NO_X$ trap, various other emission control devices, or combinations thereof. For example, device 71 may be a TWC and device 72 (not shown in FIG. 1) may be a particulate filter (PF). Further, in some embodiments, during operation of engine 10, emission control device 71 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Figure 2:
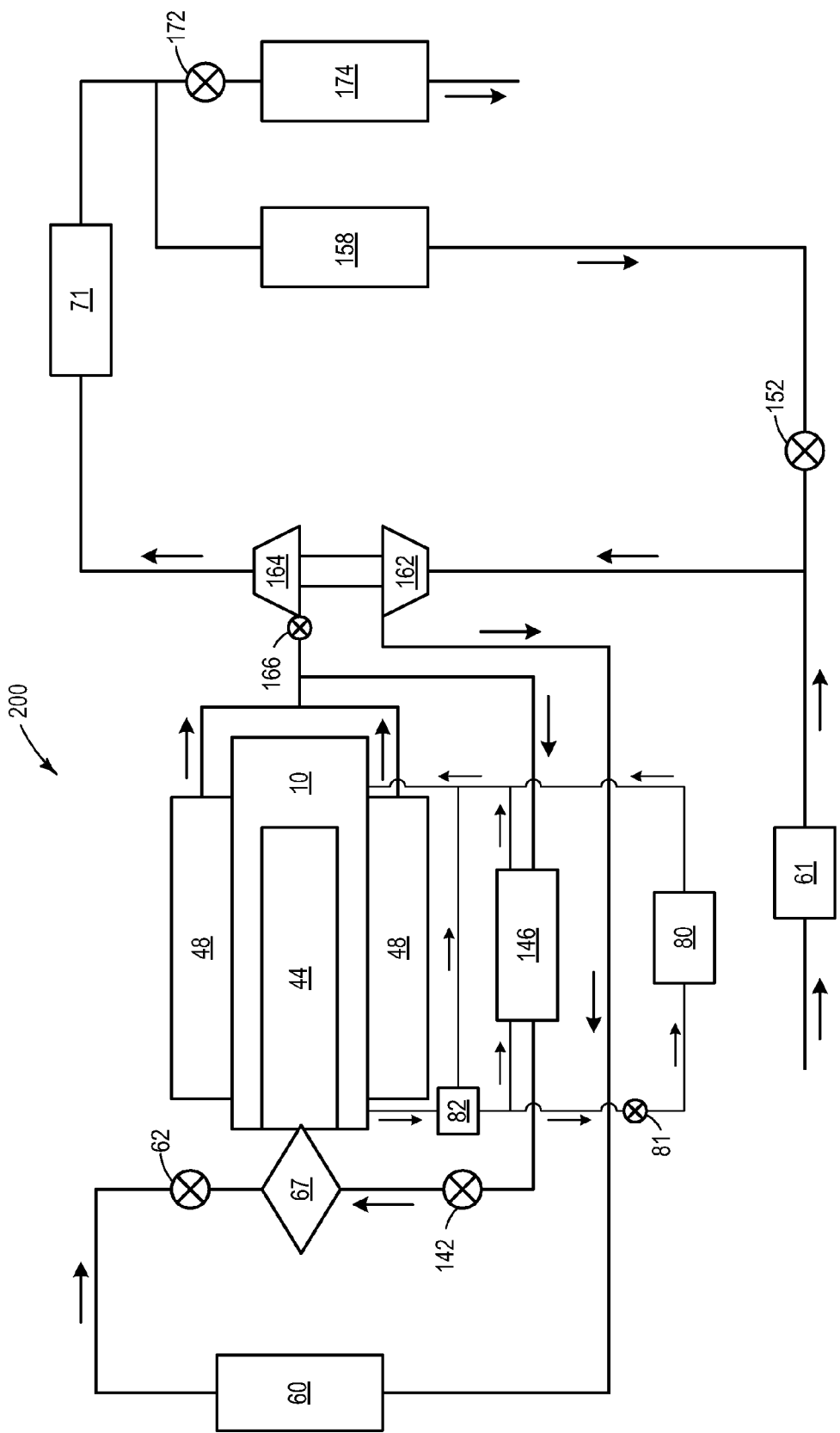
FIG. 2 shows a block diagram of an engine including an engine coolant circuit.

FIG. 2 shows another embodiment of an engine system 200 which includes an engine coolant circuit. The embodiment shown in FIG. 2 has many similar parts to the embodiment shown in FIG. 1; as such, like reference characters will be used to indicate like parts and those parts will not be described in detail again.

As shown in FIG. 2, charge air cooler (CAC) 60 is arranged along the intake passage upstream of throttle 62 for cooling engine air after it has passed through turbine 164 and compressor 162 of the turbocharger. In the depicted embodiment, engine system 200 may include a wastegate valve 166 such that, when closed, exhaust gas passes through the turbine to generate boosted intake air. As such, CAC 60 may also include a bypass (not shown) and/or coolant flow to CAC 60 may be restricted so that intake air is not cooled if the CAC is a water-to-air design.

The intake system further includes air filter 61 which may reduce abrasive particulate matter, for example, from entering the cylinders of engine 10. Further, EGR mixer 67 is shown coupled to the intake manifold in order to assist the flow of EGR into intake manifold 44 of engine 10.

The exhaust system of engine system 200 further includes exhaust back-pressure valve 172 upstream of muffler 174. Back-pressure valve 172 may regulate exhaust flow such that a desired pressure is maintained in the exhaust system, for example.

The coolant circuit in FIG. 2 is denoted by a thinner line than the air flow through engine system 200. As depicted, the engine coolant circuit includes coolant pump 82 for circulating coolant through the circuit. When coolant pump 82 is on, coolant is pumped through engine 10 and through HP-EGR cooler 146. Although not shown in FIG. 2, coolant from the same circuit may additionally be pumped through LP-EGR cooler 158 and CAC 60. Alternatively, the CAC may be cooled by outside ambient air or a low temperature coolant circuit (not shown). As shown, the coolant circuit further includes thermostat 81. Coolant flow to radiator 80 may be regulated via thermostat 81 (e.g., coolant flow through radiator 80 ceases when thermostat 81 is closed). The coolant circuit may include one or more other valves (not shown) to regulate the flow of coolant to other components of the circuit, such as CAC 60, as mentioned above.

Figure 3:
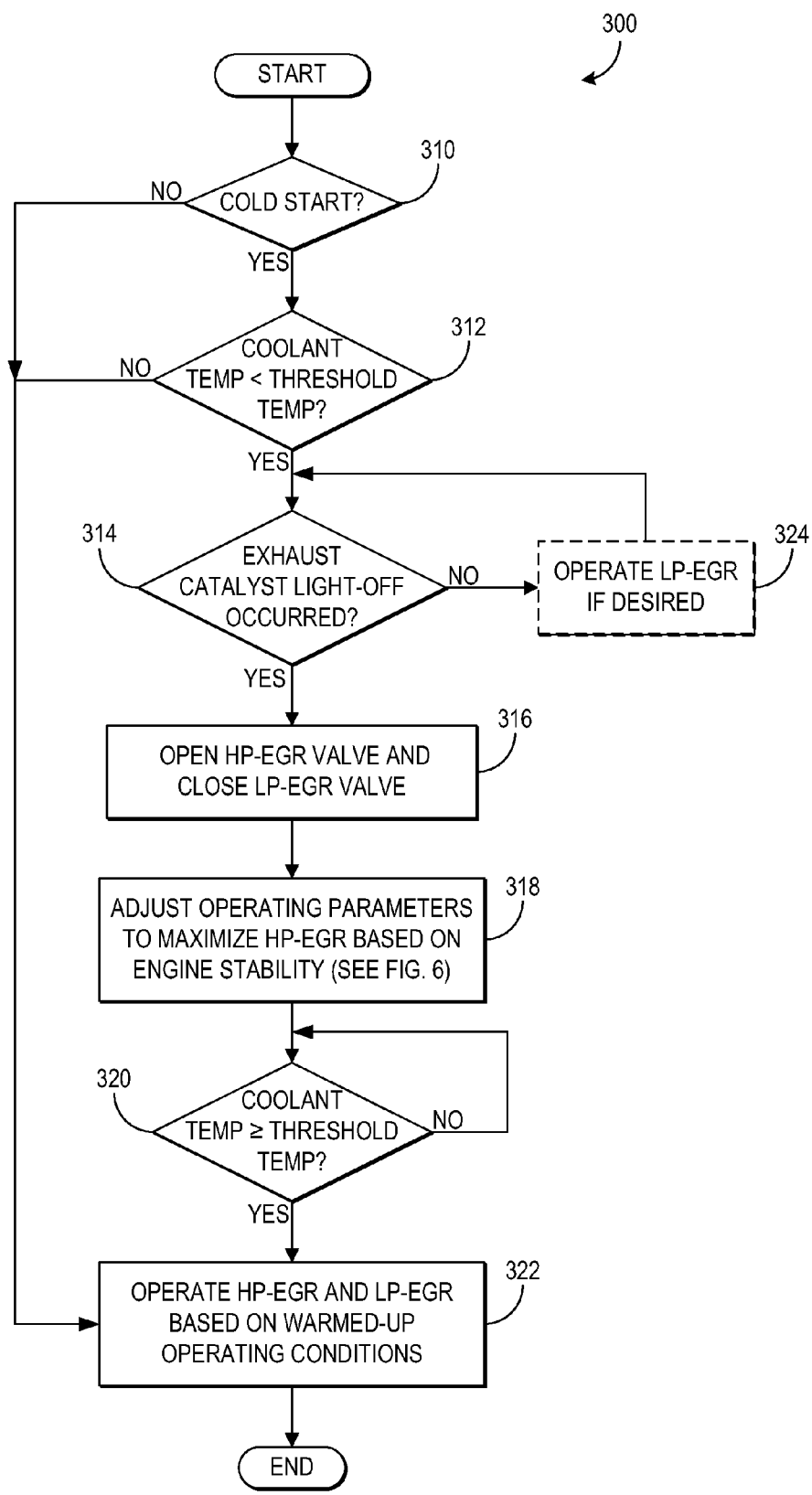
FIG. 3 shows a flow chart illustrating a routine for operating a high-pressure exhaust gas recirculation system during a cold engine start.
Figure 4:
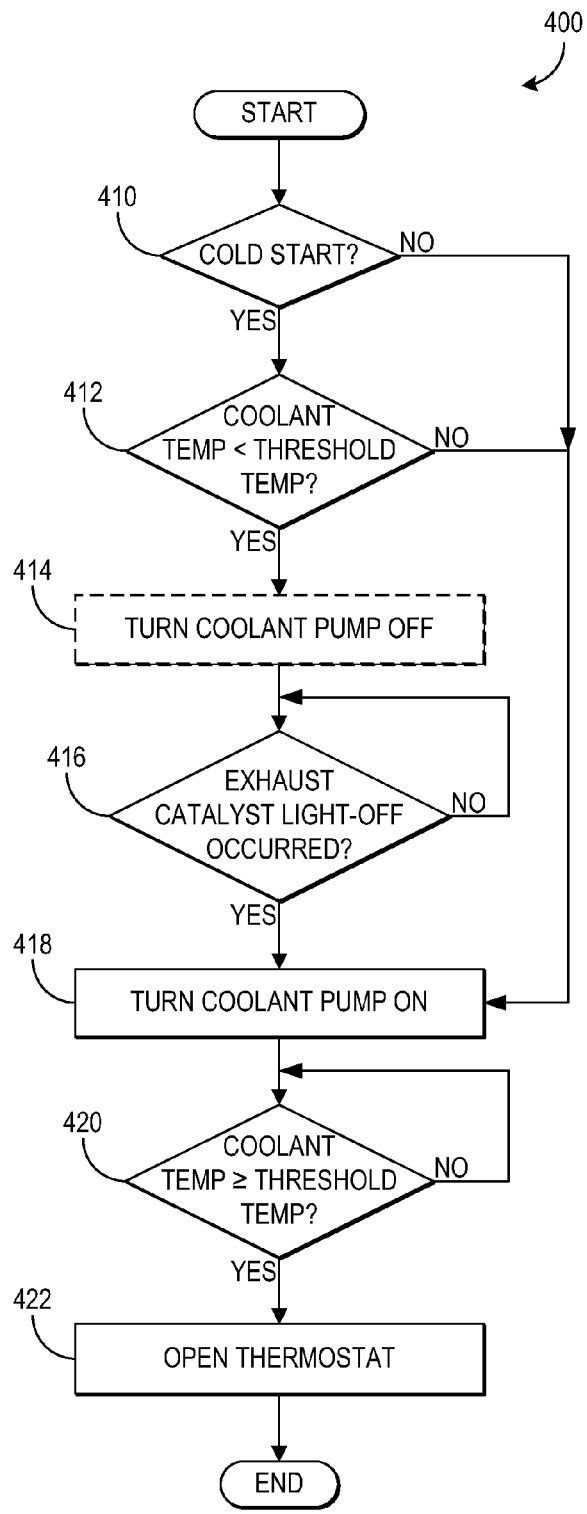
FIG. 4 shows a flow chart illustrating a routine for operating a coolant circuit during a cold engine start.

FIGS. 3 and 4 show flow charts illustrating control routines 300 and 400, respectively, for a turbocharged engine which includes high-pressure and low-pressure exhaust gas recirculation systems and a coolant circuit, such as engine 10 described above with reference to FIGS. 1 and 2. It should be noted that control routines may be carried out at the simultaneously which will become clear below.

The flow chart in FIG. 3 illustrates a routine 300 for operating a high-pressure exhaust gas recirculation system during a cold engine start. Specifically, routine 300 controls the HP-EGR and LP-EGR valves, and thus the flow of HP-EGR and LP-EGR into the engine, based on parameters such as exhaust catalyst temperature and coolant temperature during a cold engine start.

At 310 of routine 300, it is determined if the engine is under a cold start. As referred to herein, "cold start" implies the engine is started under conditions in which the engine has cooled to ambient conditions, which may be relatively hot or cold. If the engine is not under a cold start, routine 300 moves to 322 where the HP-EGR and LP-EGR systems are operated based on warmed-up operating conditions. Warmed-up operating conditions may include coolant temperature above a threshold temperature, for example.

On the other hand, if it is determined that the engine is under a cold start, routine 300 proceeds to 312 where it is determined if a coolant temperature is less than a threshold temperature. If it is determined that the coolant temperature is greater than the threshold temperature, routine 300 moves to 322 and the HP-EGR and LP-EGR systems are operated based on warmed-up operating conditions, as described above.

If, instead, the coolant is below the threshold temperature, routine 300 continues to 314 where it is determined if exhaust catalyst light-off has occurred. Exhaust catalyst light-off occurs once the exhaust catalyst has been warmed to a desired temperature, for example. If exhaust catalyst light-off has not occurred, routine 300 moves to 324 where the LP-EGR system may be operated if desired. In some embodiments, and as shown in FIG. 2, exhaust gas enters the LP-EGR system downstream of the exhaust catalyst. As such, the exhaust catalyst can receive a maximum amount of exhaust gas which may assist catalyst heating.

Once it is determined that catalyst light-off has occurred, routine 300 of FIG. 3 proceeds to 316 where the HP-EGR valve is opened and the LP-EGR valve is closed. Because exhaust gas flowing through the HP-EGR system has a higher temperature than exhaust gas flowing through the LP-EGR system, only HP-EGR is used in order to maximize the amount of heat that can be transferred to the coolant via the HP-EGR cooler.

Figure 6:
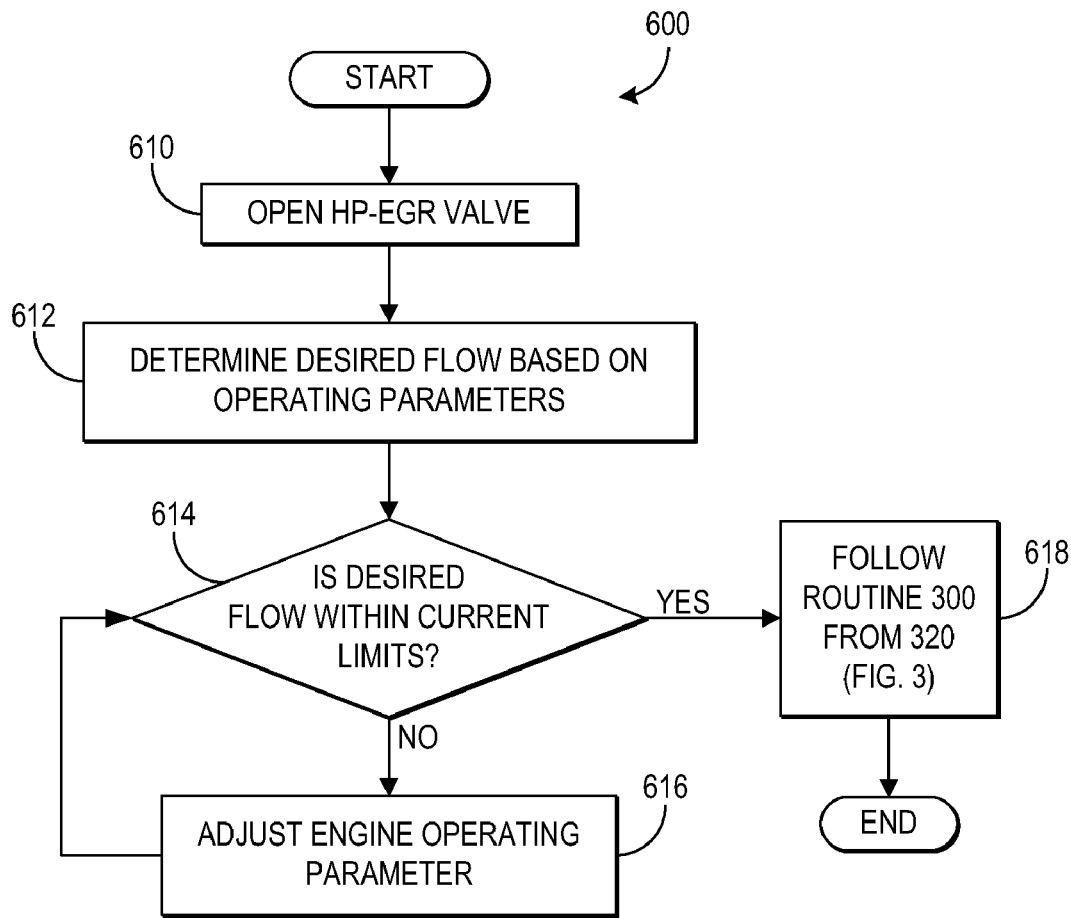
FIG. 6 shows a flow chart illustrating a routine for adjusting an amount of HP-EGR in coordination with an engine operating parameter.

The HP-EGR valve may be opened such that a maximum amount of exhaust gas flows through the HP-EGR system. Because the EGR may reduce engine stability, one or more operating parameters may be adjusted at 318 based on engine stability in order to maximize the amount of EGR. For example, one or more of the following parameters may be adjusted: cam timing, injection timing, charge motion control, use of a dual spark system, operating the engine in stratified operation, etc. In some examples, the amount of HP-EGR may be adjusted in coordination with the engine operation parameter (e.g., as an operating parameter is adjusted, the amount of HP-EGR may be increased). As an example, FIG. 6 shows a routine 600 for opening the HP-EGR valve and adjusting the amount of HP-EGR in coordination with an operating parameter.

At 610 of routine 600, the HP-EGR valve is opened. Once the EGR valve is opened, routine 600 proceeds to 612 where the desired EGR flow (e.g., amount of EGR) is determined based on operating parameters. Such operating parameters may include EGR temperature, coolant temperature, etc. For example, if the coolant temperature is relatively high (e.g., close to the threshold temperature), less EGR may be desired for heating the coolant.

Routine 600 then continues to 614 where it is determined if the desired EGR flow is within current limits. For example, the amount of EGR may be limited by combustion stability or knock. Combustion stability may be determined based on engine speed fluctuations, for example. Thus, in order to increase the EGR to maximize heat transfer to the engine coolant, an engine operating parameter may be adjusted such that engine instability is reduced, for example. If it is determined that the desired EGR flow is within current limits, routine 600 moves to 618 and routine 300 of FIG. 3 is carried out from 320.

On the other hand, if the desired EGR flow is not within current limits, routine 600 continues to 616 where an engine operating parameter is adjusted. For example, the charge motion control valve may be closed. By closing the charge motion control valve, the velocity of the air in the intake manifold, which includes EGR, may be increased and increased vaporization of fuel as well as increased burning speed of fuel in the combustion chamber may result. As such, closing the charge motion control valve may improve fuel mixing and combustion stability when there is an increase in EGR entering the combustion chambers during a cold engine start.

Once the operating parameter is adjusted, routine 600 returns to 614 where it is determined if the desired EGR flow is within current limits with the adjustment of the operating parameter. If it is determined that the EGR flow is within current limits, routine 600 moves to 618 and routine 300 is carried out from 320 and routine 600 ends. If the desired EGR flow is still not within current engine stability limits, for example, routine 600 proceeds to 616 where another engine operating parameter is adjusted. For example, after the charge motion valve is closed, the cam timing may be adjusted through the variable cam timing (VCT) system such that the internal EGR (e.g., residual fraction, dilution level) is lowered. For example, cam timing may be adjusted to decrease valve overlap so that there is less internal EGR, and therefore decreased residual gases in the combustion chamber, due to the high amount of EGR entering the combustion chambers in order to maintain combustion stability.

Routine 600 continues adjusting an operating parameter until the desired EGR flow is within current limits (e.g., combustion stability, knock, etc. are reduced). For example, after cam timing is adjusted, injection timing may be adjusted. In one example, fuel injection may be split in order to increase engine stability. For example, fuel injection may be split such that it is injected a first time early in the intake stroke and injected a second time late in the intake stroke. As such, the fuel mixture in the combustion chamber may be more homogenous resulting in more stable combustion when a large amount of EGR is present during a cold engine start.

As another example, after injection timing is adjusted, the engine may be operated using stratified operation. For example, by layering the air-fuel mixture in the combustion chamber, which includes EGR. As such, fuel mixing and burning speed of the fuel may be improved leading to increased combustion stability. Further, after the engine begins stratified operation, a dual spark system may be used. For example, stable combustion may be obtained via fast burn of the combustion mixture (e.g., shortened combustion time). As such, triggering two ignition sparks in one cylinder may shorten the combustion time and reduce the possibility of an unburned mixture of fuel and air leaving the combustion chamber.

It should be understood the order in which engine operating parameters are adjusted as described above is merely an example and the engine operating parameters may be adjusted in any suitable order. Further, other suitable engine operating parameters may be adjusted that were not described above.

Continuing with FIG. 3, at 320 of routine 300, it is determined if the coolant temperature is greater than or equal to a threshold temperature. If the coolant temperature has not reached the threshold temperature, routine 300 continues adjusting operating parameters in order to maintain engine stability while a maximum amount of EGR is used.

On the other hand, if the coolant temperature is greater than or equal to the threshold temperature, routine 300 continues to 322 where the HP-EGR and LP-EGR systems are operated based on warmed-up operating conditions and the routine ends. For example, the amount of HP-EGR may be reduced by adjusting the opening of the HP-EGR valve, for example, and the amount of LP-EGR may be increased.

Continuing to FIG. 4, a flow chart illustrating a routine 400 for operating a coolant circuit during a cold engine start is shown. Specifically, routine 400 controls coolant flow though the coolant circuit based on parameters such as exhaust catalyst temperature and coolant temperature during a cold engine start.

At 410 of routine 400, it is determine if the engine is under a cold start. As stated above, cold start implies the engine is started under conditions in which the engine has cooled to ambient conditions, which may be relatively hot or cold. If the engine is not under a cold start, routine 400 moves to 418 where a coolant pump is turned on and coolant is pumped through the coolant circuit.

On the other hand, if it is determined that the engine is under a cold start, routine 400 proceeds to 412 where it is determined if the coolant temperature is less than a threshold temperature. In some embodiments, the threshold temperature at 412 may be the same as the threshold coolant temperature at 312 of routine 300, for example. If the temperature is greater than the threshold temperature at 412, routine 400 moves to 418 and the coolant pump is turned on. Instead, if the temperature is less than the threshold temperature, routine 400 continues to 414 where the coolant pump is turned off if it is currently on.

Once the coolant pump is off, routine 400 proceeds to 416 where it is determined if catalyst light-off has occurred. As described above, catalyst light-off occurs when the catalyst has warmed to a desired temperature for operation. If catalyst light-off has not occurred, routine 400 returns to 416 and waits until catalyst light-off occurs.

If it is determined that catalyst light-off has occurred or once catalyst light-off occurs, routine 400 proceeds to 418 where the coolant pump is turned on, as described above. As such, coolant is circulated through the coolant circuit and through the engine and HP-EGR and LP-EGR systems, and exhaust gas can begin to heat the coolant to expedite engine heating.

Once the coolant pump is turned on, routine 400 of FIG. 4 continues to 420 where it is determined if the coolant temperature is greater than or equal to the threshold temperature. In some embodiments, the threshold value may be the same as the threshold coolant temperature at 320 of routine 300. If the coolant temperature has not reached the threshold temperature, routine 400 returns to 420 and waits until the coolant temperature has reached the threshold temperature.

If it is determined that the coolant temperature has reached or exceeded the threshold temperature or once the coolant temperature reaches the threshold temperature, routine 400 proceeds to 422 where a thermostat is opened. By opening the thermostat, coolant can flow through a radiator where it is cooled after. As such, the temperature of the coolant may be maintained a desired temperature for warmed-up operation conditions.

Thus, engine coolant heating may be expedited by operating a high-pressure exhaust gas recirculation system which includes a cooler during a cold engine start by transferring heat from the exhaust gas to the engine coolant via the cooler. Further, coolant may be heated at a faster rate by increasing the amount of HP-EGR (e.g., using a maximum amount of HP-EGR) after light-off of an exhaust catalyst has occurred. As described above, engine stability may be maintained by adjusting one or more operating parameters while the HP-EGR system is operating during the cold engine start.

Figure 5:
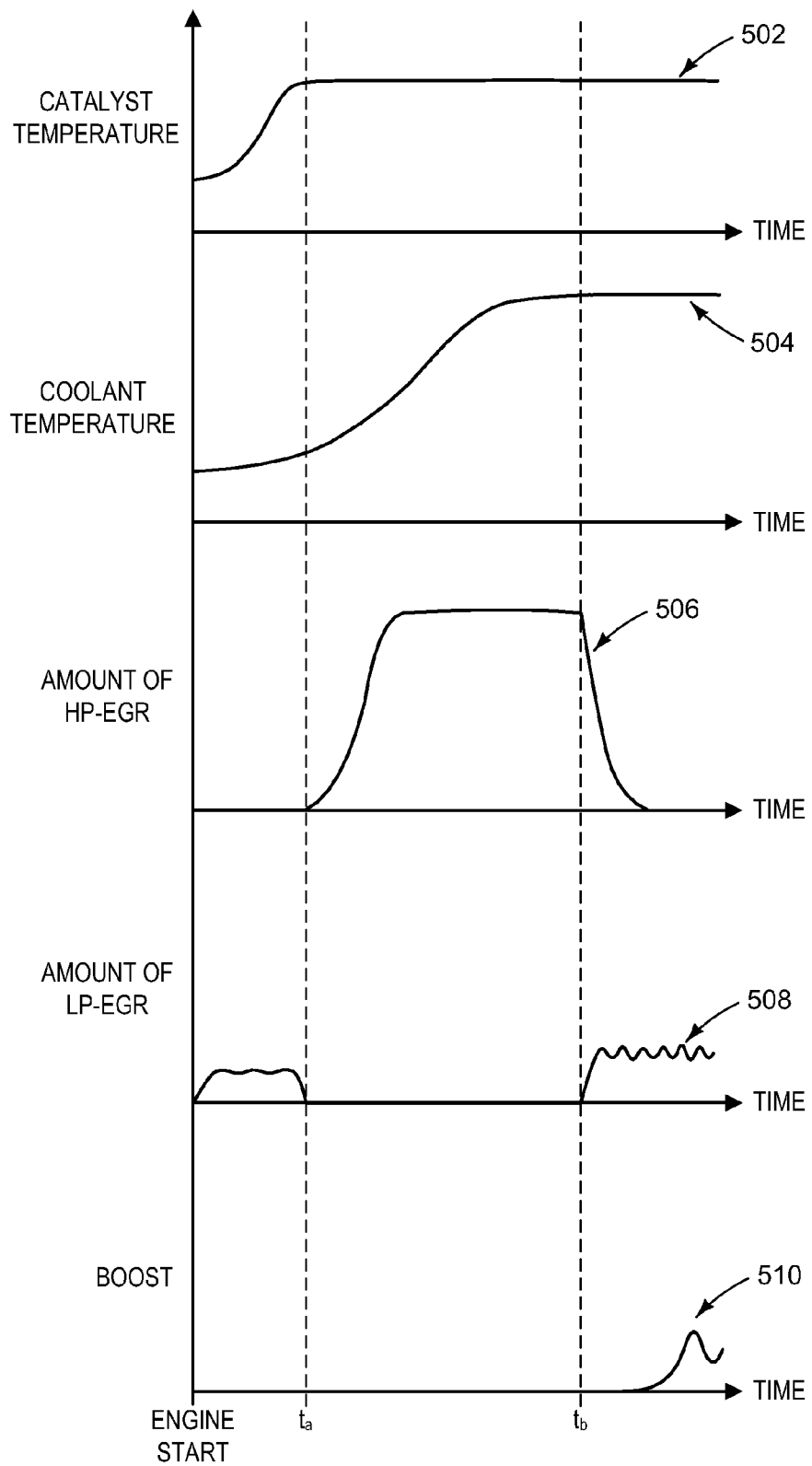
FIG. 5 shows a series of graphs showing various parameters over time during a cold engine start.

The series of graphs in FIG. 5 show various parameters over time during a cold engine start. In particular, catalyst temperature, coolant temperature, amount of HP-EGR, amount of LP-EGR, and boost are shown. The dotted line at time $t_a$ indicates the time at which light-off of the exhaust catalyst occurs. The dotted line at time $t_b$ indicates the time at which the coolant temperature reaches a threshold temperature, such as the threshold temperature described above with reference to FIGS. 3 and 4.

At 502, catalyst temperature with respect to time is shown. In this example, the catalyst temperature starts at a low temperature (e.g., ambient temperature during a cold start) and increases rapidly until a desired temperature is reached and light-off of the catalyst occurs at time $t_a$. Once light-off occurs, the temperature of the catalyst may increase slightly but remains relatively constant.

Graph 504 shows coolant temperature with respect to time. As shown in this example, the coolant temperature starts at a low temperature (e.g., ambient temperature during a cold start) and increases slowly through time $t_a$. Between times $t_a$ and $t_b$, the coolant temperature increases more rapidly until it reaches the threshold temperature at time $t_b$. The increase in temperature between times $t_a$ and $t_b$ is due, at least in part, to heating of the coolant via the heat exchange with exhaust gases flowing through the HP-EGR cooler.

At 506, amount of HP-EGR with respect to time is shown. In this example, the amount of HP-EGR starts off at zero and remains at zero until time $t_a$. As such, all of the exhaust leaving the engine can be used to heat the exhaust catalyst so that it can reach light-off in a relatively short amount of time. Once catalyst light-off occurs at time $t_a$, the amount of HP-EGR sharply increases until it reaches a maximum. As described above, by opening the HP-EGR valve to allow a maximum amount of HP-EGR to flow through the HP-EGR cooler and enter the engine, a maximum amount of heat can be transferred from the exhaust gas to the coolant via the HP-EGR coolant and the engine can be heated at a faster rate. When the coolant reaches a threshold temperature at time $t_b$, the amount of HP-EGR is decreased and after time $t_b$, the amount of HP-EGR may vary with current engine operating conditions.

Graph 508 shows amount of LP-EGR with respect to time. As shown, some LP-EGR may be used between engine start and time $t_a$. Because exhaust gas for LP-EGR may be drawn from a location downstream of the exhaust catalyst, as shown in FIG. 2, catalyst heating is not reduced with the use of LP-EGR during a cold start. In this example, between times $t_a$ and $t_b$, the amount of LP-EGR is reduced to zero LP-EGR so that the relatively lower temperature LP-EGR does not decrease the amount of heating provided to the coolant by the higher temperature HP-EGR. Once the coolant reaches a threshold temperature at time $t_b$, LP-EGR may be resumed and the amount of LP-EGR may vary based on current engine operating conditions.

At 610, boost level with respect to time is shown. As shown in this example, the engine is not boosted (e.g., the turbocharger is not operated) between the engine start and time $t_b$. For example, in order for exhaust gas to flow through the HP-EGR system and into the intake manifold, the pressure in the intake manifold should be less than the pressure in the exhaust. Boosting the engine increases the manifold pressure, and thus, exhaust gas may not flow into the intake manifold when the HP-EGR valve is opened if the engine is boosted. After the coolant reaches a threshold temperature at time tb, the turbocharger may be operated such that there is a desired level of boost for the current operating conditions. Alternatively, if boosting is desired before the desired heating is completed, HP-EGR may be reduced or stopped so that boost may be provided to meet desired engine output torque demands.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for heating a turbocharged engine, comprising:
    during a cold engine start and after light-off of an exhaust catalyst but before coolant temperature reaches a threshold, initiating operation of a high-pressure exhaust gas recirculation system (HP-EGR) by opening a HP-EGR valve and flowing EGR through a cooler of the HP-EGR system while engine coolant circulates through the cooler; and
    adjusting an engine operating parameter based on combustion stability to increase an amount of HP-EGR.

2. The method of claim 1, further comprising, before light-off of the exhaust catalyst, operating a low-pressure exhaust gas recirculation (LP-EGR) system by opening a LP-EGR valve.

3. The method of claim 2, further comprising, after the temperature of the engine coolant reaches the threshold, operating the HP-EGR and LP-EGR systems based on warmed-up engine operating conditions.

4. The method of claim 2, further comprising, after light-off of the exhaust catalyst and before the temperature of the engine coolant reaches the threshold, closing the LP-EGR valve.

5. The method of claim 1, wherein the engine operating parameter includes one or more of cam timing, injection timing, charge motion control valve position, operation of a dual spark system, and stratified engine operation.

6. The method of claim 5, further comprising, adjusting an amount of HP-EGR in coordination with the engine operating parameter.

7. The method of claim 6, wherein, in one condition, the amount of HP-EGR increases as cam timing is adjusted to decrease valve overlap, and wherein the amount of HP-EGR further increases when the charge motion control valve is closed.

8. The method of claim 1, wherein coolant circulation through the cooler is increased via a coolant pump after light-off of the exhaust catalyst.

9. A method for heating a direct injection engine in a vehicle, comprising:
   before light-off of an exhaust catalyst, operating a low-pressure exhaust gas recirculation (LP-EGR) system by opening a LP-EGR valve;
   after light-off of the exhaust catalyst and before coolant temperature reaches a threshold temperature, initiating operation of a high-pressure exhaust gas recirculation (HP-EGR) system by opening a HP-EGR valve, the HP-EGR system having a cooler, the cooler being part of an engine coolant circuit, and closing the LP-EGR valve;
   while the HP-EGR valve is open, adjusting an operating parameter based on combustion stability in order to increase an amount of exhaust gas flowing through the cooler;
   once coolant temperature reaches the threshold temperature, operating the HP-EGR and LP-EGR systems based on warmed-up engine operating conditions.

10. The method of claim 9, wherein the engine has a turbocharger and the turbocharger is boosting the engine while the HP-EGR system is operated to increase the coolant temperature.

11. The method of claim 9, further comprising turning on a coolant pump to circulate coolant through the coolant circuit after light-off of the exhaust catalyst.

12. The method of claim 9, further comprising opening a thermostat to allow coolant flow through a radiator after the coolant temperature reaches the threshold temperature.

13. The method of claim 9, wherein the operating parameter includes one or more of cam timing, injection timing, charge motion control valve position, operation of a dual spark system, and stratified engine operation.

14. The method of claim 13, wherein, in at least one condition, injection is split.

15. The method of claim 13, wherein, in at least one condition, cam timing is adjusted to decrease valve overlap.

16. A system for an engine in a vehicle, comprising:
   a turbocharger;
   a high-pressure exhaust gas recirculation (HP-EGR) system including an exhaust gas recirculation cooler and a HP-EGR valve;
   a low-pressure exhaust gas recirculation (LP-EGR) system including a LP-EGR valve;
   a catalyst positioned in an exhaust manifold of the engine;
   a coolant circuit which is coupled to the exhaust gas recirculation cooler;
   a control system comprising a computer readable storage medium, the medium comprising instructions for:
      before light-off of the catalyst, operating the LP-EGR system by opening the LP-EGR valve;
      after light-off of the catalyst and before engine coolant temperature reaches a threshold temperature, initiating operation of the HP-EGR system by opening the HP-EGR valve, and closing the LP-EGR valve;
      while the HP-EGR system is operating, adjusting an operating parameter based on combustion stability in order to increase an amount of exhaust gas flowing through the exhaust gas recirculation cooler, and wherein the operating parameter is fuel injection and injection is split; and
      once a temperature of the engine coolant has reached a threshold temperature, operating the HP-EGR and LP-EGR systems based on warmed-up engine operating conditions.

17. The system of claim 16, further comprising instructions for, after light-off of the catalyst, turning a coolant pump on to circulate coolant through coolant circuit, and, after the coolant temperature reaches the threshold temperature, opening a thermostat to allow coolant flow through a radiator.

18. The system of claim 16, further comprising instructions for initiating turbocharger operation after the coolant temperature reaches the threshold temperature.

19. The system of claim 16, wherein the operating parameter further includes one or more of cam timing, charge motion control valve position, operation of a dual spark system, and stratified engine operation.

20. The system of claim 19, wherein the amount of exhaust gas flowing through the exhaust gas recirculation cooler is increased when cam timing is adjusted to decrease valve overlap, wherein the amount of exhaust gas flowing through the exhaust gas recirculation cooler is further increased when engine operation changes to stratified engine operation.

* * * * *